(12) United States Patent
Garibay, Jr. et al.

(10) Patent No.: US 10,719,651 B2
(45) Date of Patent: Jul. 21, 2020

(54) SYNTHESIZING TOPOLOGY FOR AN INTERCONNECT NETWORK OF A SYSTEM-ON-CHIP WITH INTELLECTUAL PROPERTY BLOCKS

(71) Applicant: Arteris, Inc., Campbell, CA (US)

(72) Inventors: Raul A. Garibay, Jr., Austin, TX (US); Manadher Kharroubi, San Jose, CA (US)

(73) Assignee: ARTERIS, INC., Campbell, CA (US)

( * ) Notice: Subject to any disclaimer, the term of this patent is extended or adjusted under 35 U.S.C. 154(b) by 0 days.

(21) Appl. No.: 15/859,430

(22) Filed: Dec. 30, 2017

(65) Prior Publication Data
US 2019/0205493 A1 Jul. 4, 2019

(51) Int. Cl.
*G06F 30/30* (2020.01)
*G06F 30/392* (2020.01)

(52) U.S. Cl.
CPC .................................. *G06F 30/392* (2020.01)

(58) Field of Classification Search
CPC .................................................. G06F 17/5072
USPC .................................. 716/118, 119, 122, 138
See application file for complete search history.

(56) References Cited

U.S. PATENT DOCUMENTS

| | | | | | |
|---|---|---|---|---|---|
| 5,485,396 | A | * | 1/1996 | Brasen | G06F 17/5072 716/123 |
| 5,623,420 | A | * | 4/1997 | Yee | G06F 17/5068 716/120 |
| 5,638,288 | A | * | 6/1997 | Deeley | G06F 17/5072 257/E27.105 |
| 5,761,078 | A | * | 6/1998 | Fuller | G06F 17/5068 716/103 |
| 6,002,857 | A | * | 12/1999 | Ramachandran | G06F 17/5072 716/122 |
| 6,360,356 | B1 | * | 3/2002 | Eng | G06F 17/5045 716/105 |

(Continued)

*Primary Examiner* — Stacy Whitmore
(74) *Attorney, Agent, or Firm* — Dana Legal Services; Jubin Dana; John Dahnad (57) ABSTRACT

A SoC interconnect network topology is represented. The corresponding SoC floorplan is divided into windows, which are contiguous and non-overlapping. Within each window a subnetwork of the SoC interconnect network topology is defined that includes links or communication paths between IP blocks in the window as well as links or communication paths that traverse the window. At the shared boundaries of the windows, ports are added and defined as virtual ports. The overall SoC topology can be optimized and synthesized by optimizing each window independently and then incrementally optimizing all links, from end-to-end, that traverse two or more windows. The SoC topology is edited, such as by adding switches, removing switches, and adding and removing switches on routes. An initial location of elements within the floorplan is automatically computed and recommended. Locations can also be edited. Statistical metrics are calculated, including wire length, switch area, SoC area, and maximum signal propagation rate. The SoC overall interconnect network topology is represented by the plurality of windows and the respective subnetworks of each widow. The windows are analyzed and combined and optimized to obtain an overall near-optimal SoC interconnect network topology.

16 Claims, 9 Drawing Sheets

(56) References Cited

U.S. PATENT DOCUMENTS

| | | | | |
|---|---|---|---|---|
| 6,378,121 | B2* | 4/2002 | Hiraga | G06F 17/5077 |
| | | | | 716/129 |
| 6,449,761 | B1* | 9/2002 | Greidinger | G06F 17/5072 |
| | | | | 716/122 |
| 6,883,455 | B2* | 4/2005 | Maeda | B63B 35/731 |
| | | | | 114/357 |
| 7,096,436 | B2* | 8/2006 | Bednar | G06F 17/5068 |
| | | | | 707/999.001 |
| 7,398,497 | B2* | 7/2008 | Sato | G06F 17/5045 |
| | | | | 716/112 |
| 2008/0046854 | A1* | 2/2008 | Tang | G06F 17/5072 |
| | | | | 716/113 |
| 2013/0283226 | A1* | 10/2013 | Ho | G06F 17/5072 |
| | | | | 716/122 |
| 2014/0298281 | A1* | 10/2014 | Varadarajan | G06F 17/5045 |
| | | | | 716/113 |
| 2019/0073440 | A1* | 3/2019 | Farbiz | G06F 17/5072 |

* cited by examiner

SYNTHESIZING TOPOLOGY FOR AN INTERCONNECT NETWORK OF A SYSTEM-ON-CHIP WITH INTELLECTUAL PROPERTY BLOCKS

FIELD OF THE INVENTION

The invention is in the field of chip design and, more specifically, for optimizing communication paths in the design of system-on-chip interconnect network topologies.

BACKGROUND

The designers of chips connect cores or Intellectual Property (IP) blocks, which comprise logic cells and often multiple ports. Certain software, for chip design, displays chip floorplans. Floorplans define various physical regions, in which the logic cells of certain cores or IPs can be placed and blockages where no logic cells can be placed.

A network-on-chip (NoC) is an efficient and widely used mechanism for connecting cores and IP blocks in a System-on-Chip (SoC). Cores have standard interfaces or ports. A SoC connects cores through their interfaces, in order for the cores or IPs to communicate with each other. A SoC includes logic cells, which are placed throughout the floorplan, and wires, which are routed throughout the floorplan. A SoC includes an array of IP blocks that are implemented as either "hard" blocks, whose physical shape and size is mostly fixed, or "soft" blocks, which are generally implemented at the end of a design cycle, using space left by the hard blocks. For example, an interconnect of a SoC connects communication ports on both hard and soft IPs with "links". The interconnect is an IP that is a soft IP.

Developing a physical interconnect topology can be done using conventional approaches for SoCs or chips with small numbers of IP blocks and simple floorplans. However, chips now include many cores or IPs and the number is growing increasingly larger with correspondingly more complex floorplans. Given a SoC with a highly irregular floorplan and more than 100 IP port connections, it is very challenging to generate an interconnect topology that is near-optimal for the floorplan and various QoR metrics, such metrics including, for example, area, power, frequency performance, bandwidth, etc. Therefore, what is needed is a method and a system to synthesize the design of a complex or irregular SoC interconnect network topology within the physical implementation and constraints of a floorplan.

SUMMARY OF THE INVENTION

The invention is directed to a method and system of synthesizing a complex or irregular SoC interconnect network topology within the physical implementation and constraints of the floorplan. Some embodiments, based on the various aspects of the invention, allow for an alternative representation of a network-on-chip (NoC) or a system-on-chip SoC interconnect network topology without the physical view. Some embodiments, based on the various aspects of the invention, also allow synthesizing of the SoC topology using multiple windows on top of the physical view. A simple form of synthesizing is to select between alternative routes or add elements to routes. Some steps of advanced synthesizing, based on the various aspects of the invention, entail moving elements or links from a set of shared routes by reordering the elements within a set of routes.

In accordance with various aspects, some embodiments of the invention provide for synthesizing the physical links for the SoC interconnect network topology elements. In accordance with some aspects of the invention, some embodiments provide for automatically suggesting physical locations for the links or lines within the SoC topology elements. Lines or links indicate connections between elements within the SoC topology.

In accordance with some aspects of the invention, some embodiments of the invention calculate metrics. Some metrics encompassed by various embodiments include wire length, area, wire density, distance-based timing, bandwidth, and transaction latency at endpoints.

The invention is directed to concrete methods and system that may be implemented using a computer. Such methods are performed by one or more computers executing code stored on one or more non-transitory computer-readable media.

DETAILED DESCRIPTION

All publications and patents cited in this specification are herein incorporated by reference as if each individual publication or patent were specifically and individually indicated to be incorporated by reference and are incorporated herein by reference to disclose and describe the methods and/or system in connection with which the publications are cited. The citation of any publication is for its disclosure prior to the filing date and should not be construed as an admission that the invention is not entitled to antedate such publication by virtue of prior invention. Further, the dates of publication provided may be different from the actual publication dates, which may need to be independently confirmed.

A system-on-chip (SoC) is a network, including connected elements. In SoC there are two vital things: hardware and software that acts as the control center of the components. The basic aim of the SoC is to make sure that both the hardware and the software applications work in a parallel manner. To obtain this, the SoC tends to make use of hardware blocks for the hardware components and software drivers for software components. A network-on-chip (NoC) is also a network that includes elements. With NoC operations, Intellectual Property (IP) blocks exchange the data using a common platform called a network interconnect or transport, which is a "common transport".

NoCs and SoCs are subsystem based integrated circuits that integrate every component of a particular system. A NoC is designed for an organized network; a SoC is meant for an organized device, such as a like computer. A NoC acts as an integral link between the IP blocks and the systems on the chip of the computer, whereas the SoC connects the computer or any other electronic device in one sole system. So, a SoC is more like an embedded system that ties every unit of a particular device together. Routing a particular data within the SoC requires a lot of wiring. This increases the wiring congestion causing a lot of complications for optimization and synthesis of a SoC. Thus, for simplicity, the aspects and embodiment of the invention are discussed in the context of an interconnect network of a SoC with IP blocks. In accordance with the various aspects and embodiments of the invention, the interconnect network design can be implemented as a NoC or with a NoC.

As discussed herein, elements in a NoC or a SoC are typically connected via links or communication paths. A "communication link" or "link," as used herein, is a connection between two different IP blocks. A "communication path" or "path," as used herein, is the physical routing representation of the link. Some such elements are network interface units, switches, pipeline stages, data width converters, clock domain adapters, power domain adapters, firewalls, and probes. Each element has an approximate physical location within the floorplan. A SoC interconnect network connects elements to one another in a network. The organization of connections between elements is the SoC interconnect network topology.

It is difficult to determine the best SoC topology without a view of the floorplan and how the SoC fits into the floorplan. One conventional approach is to organize the SoC topology based on quality-of-service requirements of cores. For example, one might connect cores which require low memory latency closest to a memory interface core. Another conventional approach is to group cores based on function. For example, one might group video encoding and decoding cores within the SoC topology. Another conventional approach is to minimize the importance of the spatial distribution of the elements of the SoC within the floorplan by placing the SoC entirely within a central portion of the chip.

The various aspects and embodiments of the invention disclose a way to design and synthesize a SoC topology within the physical constraints of a floorplan that makes it easier and quicker to make optimizations and reduces the risk of design errors.

In accordance with various aspects of the invention, some embodiments of the invention describe the topology of a SoC as a set of network elements or IP blocks. The various aspects of the invention connect IP blocks or elements using a set of paths or links that allow communication between the IP blocks or elements. Each path is an ordered list of elements that traffic traverses to get from one source port or source endpoint to one destination endpoint or destination port. Network interface elements are endpoints or ports.

In accordance with various aspects of the invention, some embodiments of the invention describe the topology of a SoC as a set of router elements, each having connectivity to one or more other routers. Routers can include endpoints or ports. Connections between routers can include other network elements.

Every network element provides for a certain level of data throughput, known as a bandwidth. For network elements connected to more than two other elements, available bandwidth is a property of each connection. Maximum bandwidth is a function of clock speed (for synchronous logic) and bus width. The bus width determines the number of wires physically connected between elements.

Initiators are a type of endpoint that is a source of requests and a destination of responses. Target endpoints are a destination of requests and source of responses. SoC interconnect networks can facilitate transactions, as requested by initiators, and those transactions require at least one request and at least one corresponding response. The time from when an initiator issues a transaction request to the SoC interconnect network until the SoC interconnect network returns a response to the initiator, known as a latency, is a property of each requested transaction. Those interested in performance often analyze latency statistically or algorithmically for give traffic patterns, but the SoC interconnect network topology sets a minimum latency for each link or route.

In accordance with various aspects of the invention, some embodiments of the invention use computer software to read the physical constraints of a chip floorplan, read a description of a SoC topology, and renders them in a combined arrangement on a display.

The physical constraints define the locations of SoC IP block and core endpoints and the areas of the chip where the SoC logic can be added. Some embodiments guide the placement of some SoC elements, restrict placement of some, or both. For example, some embodiments limit all elements of a particular power domain to a particular polygon-shaped bounding box in which place and route (P&R) can easily insert the necessary power nets.

A graphical view and feedback is a fast and easy way to understand and modify a SoC interconnect network topology and a floorplan. In accordance with various aspects of the invention, some embodiments employ a computer program with a display or a graphical user interface (GUI). The GUI displays a layout of SoC elements and their connections as one or more layers on top of a physical view. In accordance with various aspects of the invention, some embodiments constrain the location of elements and in some embodiments the links or connections, according to the floorplan.

In accordance with various aspects of the invention, some embodiments begin by reading a SoC topology description and a floorplan description and creating an initial layout for the SoC elements. That step need not be optimal, and ideally is fast. Various algorithms are suitable, such as a simple set of heuristics that minimizes wire length between SoC elements. The initial layout may be displayed.

After the initial layout creation, a SoC designer can edit the SoC topology interactively. Some types of topology edits are possible with various embodiments include creating elements, deleting elements, and modifying routes. According to some embodiments, editing routes automatically causes the creation or deletion of elements.

In accordance with various aspects of the invention, in some embodiments the SoC designer can also edit the physical layout. Some types of physical layout edits possible with various embodiments include changing the placement of SoC elements, such as endpoints, and changing physical constraints such as polygon shapes and sizes.

According to some aspects and embodiments, after editing, the designer saves the SoC topology, endpoint locations, physical constraints, or a combination of those. Computer-based implementations may save to a local or remote non-transient computer readable medium.

In accordance with various aspects of the invention, some embodiments perform analysis of the SoC topology and floorplan. Analysis can include computing statistics, such as total wire length, element area, wire density, and path timing. Some embodiments perform analysis when requested by a user. Some embodiments perform analysis automatically, but approximately, during an editing session to give immediate feedback to the designer regarding the consequences of their edits on the performance and ability to implement, physically, a chosen SoC topology.

In accordance with various aspects of the invention and in some embodiments, the simultaneous representation of the SoC interconnect network topology and physical view of a chip is in one layer. In other embodiments, it is in multiple layers. Information from one-layer overlays information from another layer. Different embodiments represent layers differently and in different orders.

Figure 1:
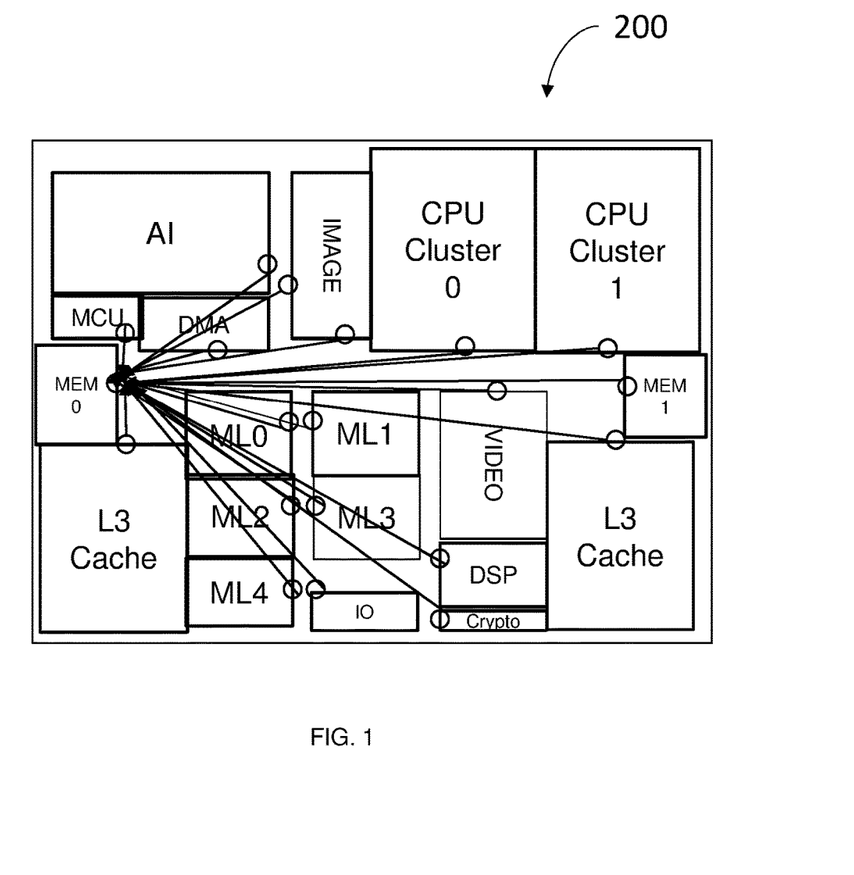
FIG. 1 shows a floorplan of a system with links between memory and other Intellectual Property (IP) blocks.

Referring now to FIG. 1, a SoC for a chip 200 is shown with various IP blocks or elements, including memory units (MEM0 and MEM1). The chip 200 has many communication connections or links between the various IPs. For example, multiple links are shown between MEM0 and each of the various IPs. Each link can have its own specification, including, for example, bandwidth, priority, frequency. A near-optimal interconnect topology for the physical floorplan takes into account the actual IP port locations and white space left for new logic, as well as the communication link specifications.

Figure 2:
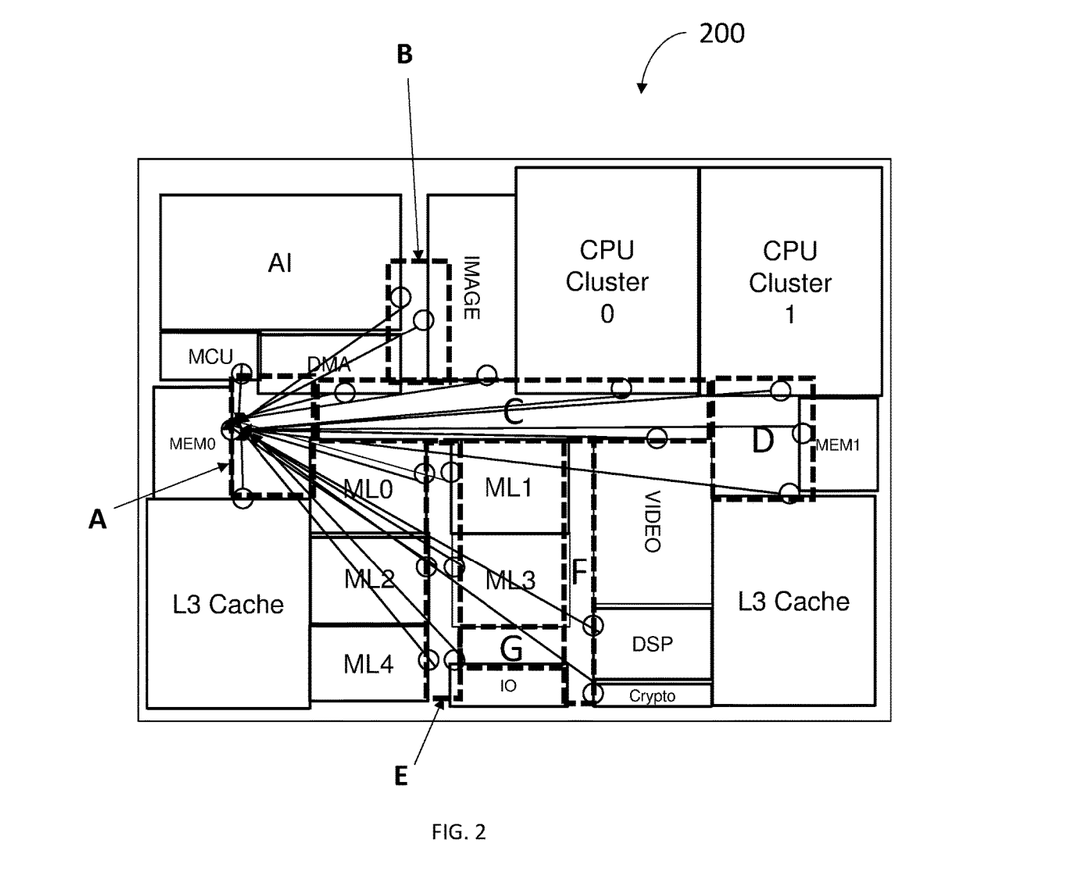
FIG. 2 shows the system of FIG. 1 with a set of non-overlapping and contiguous windows in accordance with the various aspects of the invention.

Referring now to FIG. 2, the chip 200 of FIG. 1 is shown with set of non-overlapping contiguous windows, such as windows A, B, C, D, E, F, and G. The windows cover all the white space in the floorplan of chip 200. The windows also cover all the ports that are used by links to communicate between ports. As such, the windows collectively comprise the entire interconnect network topology of the chip 200. However, each window represents a smaller and much more simple topology to synthesize, which is more efficient than addressing the entire topology of the SoC.

Figure 3:
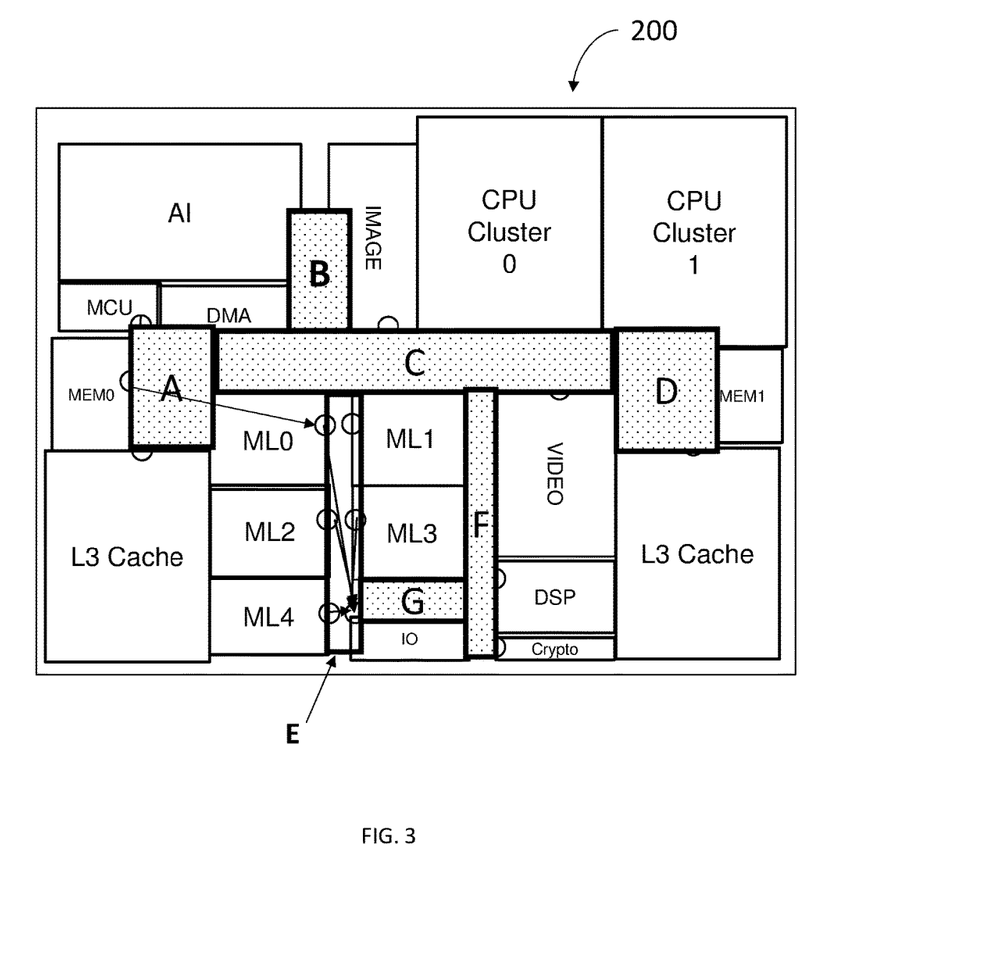
FIG. 3 shows the system of FIG. 2 with links between ports, internal and virtual, for window E in accordance with the various aspects of the invention.

Referring now to FIG. 3, the chip 200 is shown with various links within window E, which includes links contained completely within window E and links that connect an IP with a port in window E to another IP having a port in a different window so that at least two windows would be traversed. For example, the link from the port of ML0 to the port of IO is a link that is in window E. The link from ML0 to MEM0 would traverse window E, C, and A. Thus, in accordance with the embodiments of the invention, each link within the chip 200 will either be contained completely within a window or traverse multiple windows.

For the links that traverse multiple windows, in accordance with the various aspects of the invention, the link that originates within a specific window is connected to a virtual port. A "virtual ports" is a port that at the boundary of a window with a neighboring contiguous window. The virtual port handles a link that crosses from the boundary of one window into a neighboring window. Thus, with respect to any one window, the network of all links for that window includes all IP ports contained within that window and all virtual ports on the window, all of said links are completely contained within the window. In accordance with the various aspects of the invention, the physically optimal topology for the ports, which are the IP ports and virtual ports, within the window are largely independent of the implementation of the physical topology of other windows. As such each window's topology can be synthesized mainly independent of the neighboring windows.

Figure 4:
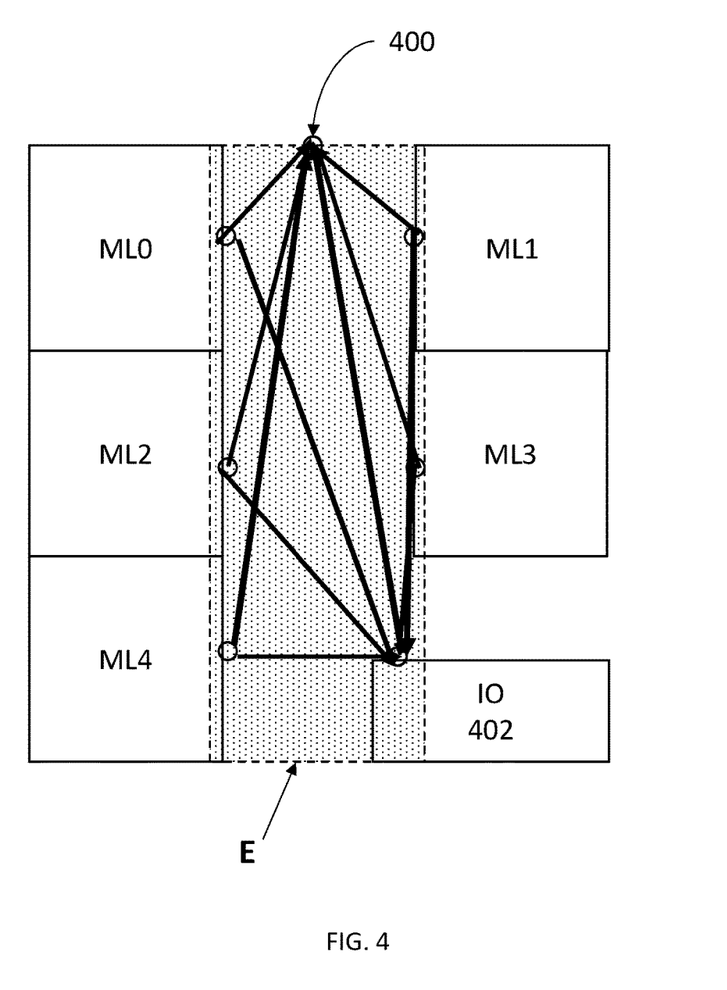
FIG. 4 is a more detailed view of FIG. 3 for window E in accordance with the various aspects of the invention.

Referring now to FIG. 4, the window E is shown in greater detail. In this example, each port on IP blocks ML0-ML4 communicate with IO 402. Also, each port on IP blocks ML0-ML4 communicate with MEM0, shown in FIG. 3. Thus, window E includes internal links between each port of the IP blocks and between each port of the IP block and virtual port 400. The links to IO 402 are internal or locally contained. The link to MEM0 must traverse from window E to other windows in order to reach the port of MEM0. The link traverses window C and then to window A to complete the link. In window E, the port for MEM0 will be represented by the virtual port 400. The scope of the present invention is not limited by the placement or location of the virtual port. In this example, virtual port 400 is arbitrarily placed along the top or north edge of window E, which is the boundary neighboring and shared with window C. A new set of local links is created which includes the previous links from ML0-4 to IO 402 and new links from ML0-4 to the MEM0 through the virtual port 400. Once the sub-network local to window E is complete, it can be replaced with a model (virtual IP) of the sub-network to abstract away the complexity and ease the generation of sub-networks for other windows.

Figure 5:
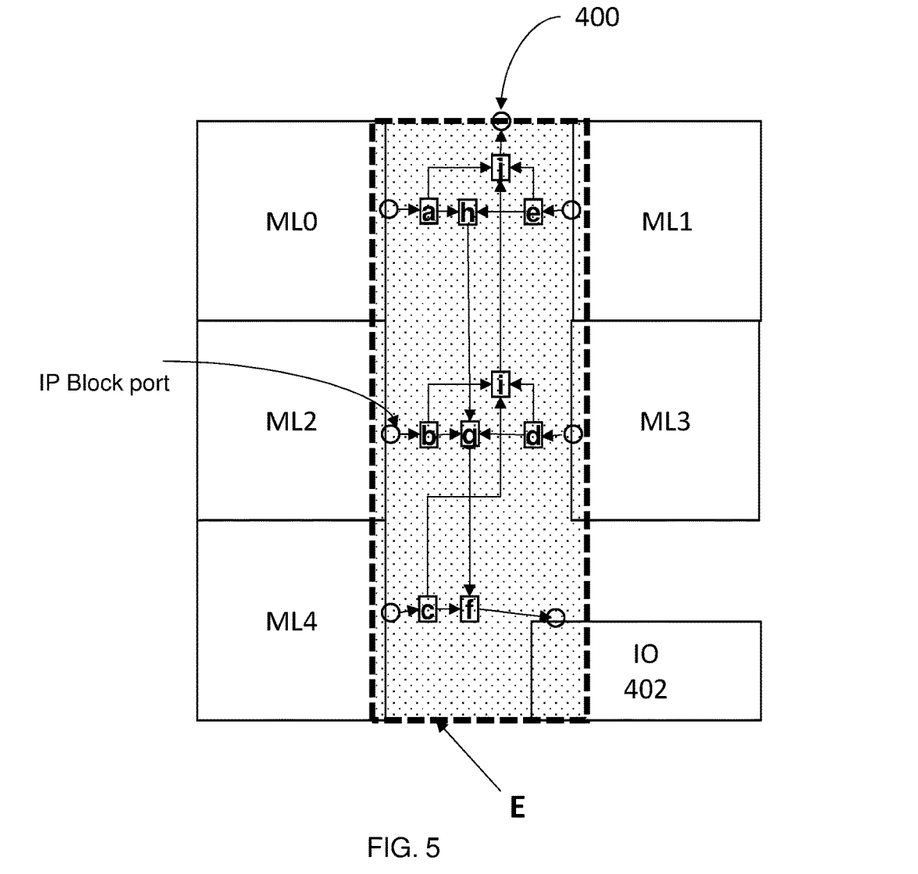
FIG. 5 shows a local topology for window E of FIG. 4 with various elements in accordance with the various aspects of the invention.

Referring now to FIG. 5, window E is shown with the virtual port 400 and various element handling the communication paths or links. In accordance with some aspects and embodiment of the invention, the communication on the links in window E is low bandwidth and has similar frequency requirements. As such. a topology is created as shown, that includes recommendation for placement for switch elements. In accordance with some aspects and embodiment of the invention, elements a-e can be buffers or repeaters distributing the outputs of each ML to multiple points. In accordance with some aspects and embodiment of the invention, elements f, g, and h create a path from each ML to the IO 402, where h and f are 2-1 switches and g is a 3-1 switch. In accordance with some aspects and embodiment of the invention, the virtual port 400 is connected to the subnetwork of window E. The elements i and j, which connect the virtual port 400 to the subnetwork of window E, create a network from the outputs of each ML to the virtual port 400 for MEM0, where each element (i and j) is a 3-1 switch. In accordance with some aspects and embodiment of the invention, a similar return link or response network would be implemented for data returning to window E.

Figure 6:
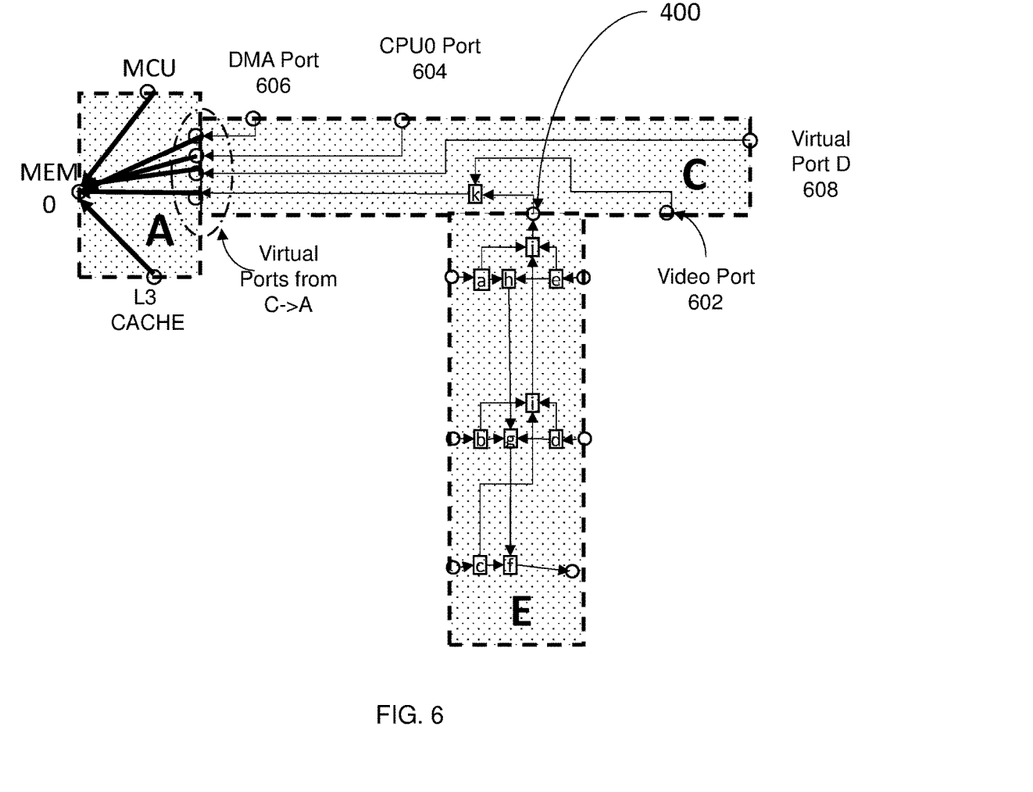
FIG. 6 shows a link path between two IP blocks located in different windows in accordance with the various aspects of the invention.

Referring now to FIG. 6, multiple windows are shown with completed communication paths or links. For example, to complete the link or communication path from an IP within window E to MEM0, the connection must traverse from window E, through window C, to the port of MEM0, which is in window A. In accordance with some aspects and embodiment of the invention, the process used to create the network in window E is used to create a network local to the other windows. Window C includes a video port 602. In accordance with some aspects and embodiment of the invention, it is possible to merge the virtual port 400 output of window E with the video port 602 and represent that with an element, such as switch K due to the requirements of these links being compatible. This creates one physical connection to the virtual port to window A.

Window C covers various IP blocks and has multiple neighboring windows. Thus, window C includes various virtual ports and ports for IP blocks. In accordance with some aspects and embodiment of the invention, the other ports included in window C have diverging requirements, so each goes to a unique virtual port on window A to allow a communication path or link to IP within window A, including MEM0. Within window A, the 4 virtual ports from window C are combined with ports for IP blocks, such as the Micro Controller Unit (MCU) and L3 Cache, to complete the connections to MEM0. In accordance with the aspects and embodiment of the invention, the complete network topology with communication paths or links is assembled from the simpler partitions of windows, which fully implement a local sub-network.

Figure 7:
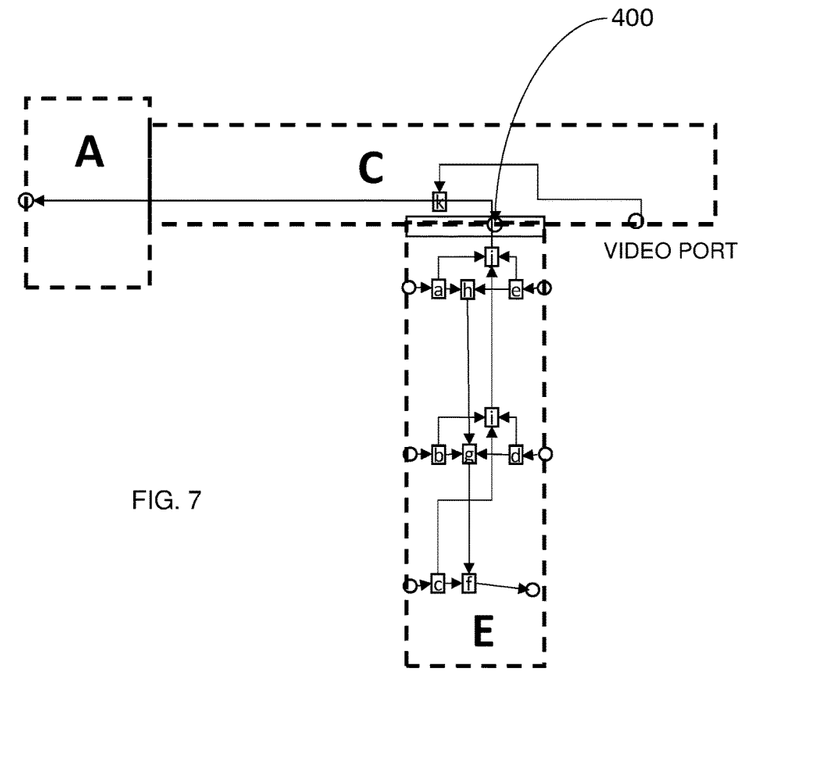
FIG. 7 shows an optimization at the window boundaries for the link path of FIG. 6 in accordance with the various aspects of the invention.

Referring now to FIG. 7 and again to FIG. 5, optimization of links from each port of ML (of FIG. 5) to MEM0 is shown. In accordance with the aspects and embodiment of the invention, the synthesis and optimization merges all of the windows involved in the communication path or link by connecting all links at virtual ports as necessary. Then a final optimization pass evaluates the path in its entirety. As needed, the optimization and synthesis can make minor changes to element placement, but will not significantly restructure the topology of the network.

Figure 8A:
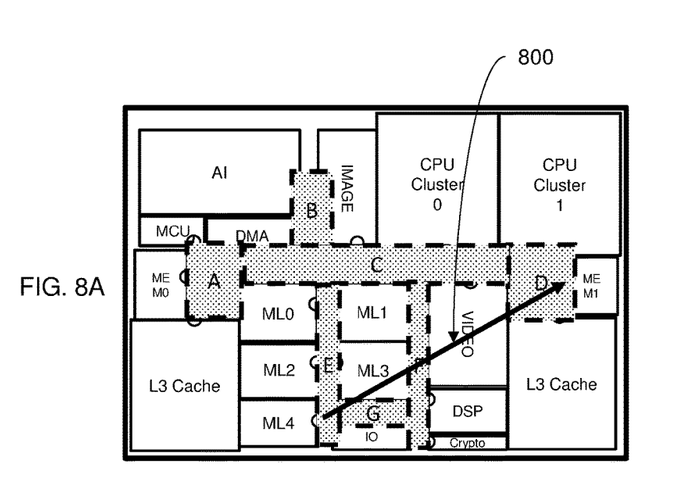
FIG. 8A shows a link between two IP blocks in accordance with the various aspects of the invention.
Figure 8B:
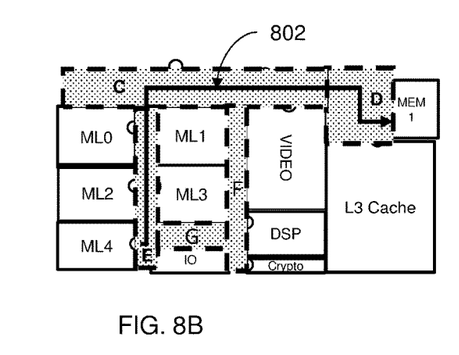
FIG. 8B shows one possible communication path for the link of FIG. 8A in accordance with the various aspects of the invention.
Figure 8C:
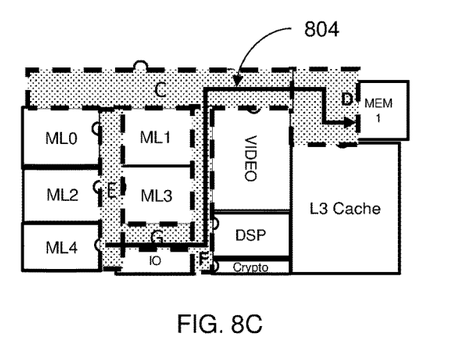
FIG. 8C shows one possible communication path for the link of FIG. 8A in accordance with the various aspects of the invention.

Referring now to FIG. 8A, a link 800 is shown between the port of ML4, which is in window E, and the port of MEM1, which is in window D. In this example, during the synthesis and optimization process, the link 800 may be established using alternative paths because there are different combination or sequence of windows that can be traversed. Thus, it is not obvious what is the best path through the windows for this link and all possible options are synthesized and considered. FIG. 8B shows one combination or sequence of routing a communication path 802 for the link 800 to get from the port of ML4 to the port of MEM1, in accordance with some embodiments of the invention, through window E to window C to window D. The path 802 (or route (?)) will traverse from the virtual port of window E through window C to the virtual port of window D. FIG. 8C shows one combination or sequence of routing a communication path 804 for the link 800 to get from the port of ML4 to the port of MEM1, in accordance with other embodiments of the invention, through window E to window G to window F to window D. Thus, for this example, the path 804 (or track) will traverse from the virtual port of window E, through the virtual ports of window G and window F, and then to the virtual port of window D.

Either path 802 or path 804 could be optimal depending on physical design constraints of the SoC interconnect network for the chip. Some example of constraints include: area of each channel, amount of other logic to be implemented in each channel, bandwidth demands, performance requirements, etc. In order to select one of the paths, a virtual IP subnetwork block, for each path, is created independently. The system can then evaluate each alternative path as a unique scenario.

In accordance with aspects and embodiments of the invention, each scenario will be carried as far through the process as necessary in order to identify which is better. Once a better alternative is identified, the other alternatives are dropped or pruned, and the associated Virtual IP is discarded. In accordance with the invention, the subnetwork in window D is not affected by the path taken to get to the virtual port of window D. Thus, the subnetwork for window D can be generated independent of path taken with respect of FIG. 8B and FIG. 8C.

Figure 9:
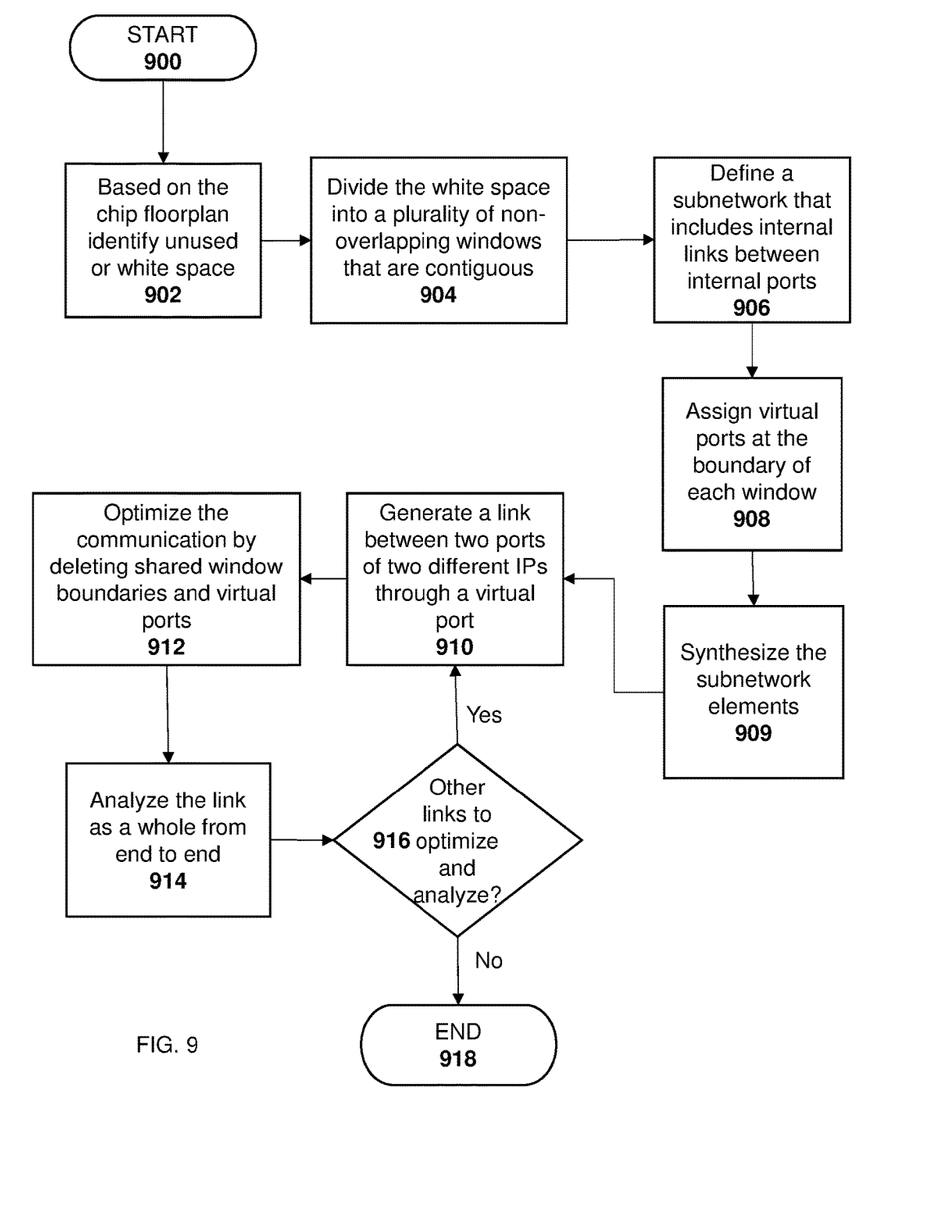
FIG. 9 shows a flowchart for synthesizing and optimizing a chip's topology in accordance with various aspects of the invention.

In accordance with various aspects and embodiments of the invention, the process for synthesizing and optimizing a chip's topology is shown in FIG. 9. The process begins at step 900. At step 902, the chip's floorplan is evaluated, and unused space or white space is identified. At step 904, the white space is divided into a plurality of non-overlapping windows that are contiguous. At step 906, all the internal links for the window are determined and represented in a subnetwork. Each link represents a communication path between one IP block's port to the port of another IP block, both of which IP blocks are located inside the boundary of the window, or to a port located on the boundary of the window. At step 908, virtual ports are assigned to the boundary of each window. The virtual ports handle communication paths between internal ports of the window and ports located outside the boundary of the window.

At step 909, synthesize the subnetwork elements, such as switches, buffers, etc. At step 910, a link or communication path between two ports is established. In accordance with some aspects and embodiments of the invention, the two ports are positioned in two different windows that share a common boundary. The link uses or goes through a virtual port on the shared boundary of the windows and is one intended communication path.

At step 912, the link or communication path that traverses at least two windows is optimized by deleting shared window boundaries and virtual ports traversed by the link.

At step 914, the optimized link is analyzed as a whole, from the initiating IP's port to the target IP's port so that the link is optimized as a whole from end to end. At step 916, it is determined if there are any other links or communication paths to optimize. IF so, the process returns to step 910. IF not, then the process ends at step 918.

Embodiments of the invention are often used in preparation for the synthesis and place & route steps of a chip design flow. The locations of SoC elements, as calculated by a method and/or specified by a user, are valuable information to guide the P&R tools to achieve better results.

Physical machines, such as semiconductor chips, are modeled by hardware description language representations of the logical or functional behavior of machines according to the invention described and claimed, and one or more non-transitory computer readable media arranged to store such hardware description language representations all can embody machines described and claimed herein.

Some aspects and embodiments of physical machines described and claimed herein are programmable in numerous variables, combinations of which provide essentially an infinite variety of operating behaviors. Some aspects and embodiments of hardware description language representations described and claimed herein are configured by software tools that provide numerous parameters, combinations of which provide for essentially an infinite variety of physical machine embodiments of the invention described and claimed. Methods of using such software tools to configure hardware description language representations embody the aspects and embodiments of the invention described and claimed.

The behavior of either or a combination of humans and machines; instructions that, if executed by one or more computers, would cause the one or more computers to perform methods according to the invention described and claimed; and one or more non-transitory computer readable media arranged to store such instructions embody methods and systems described and claimed herein. Each of more than one non-transitory computer readable medium needed to practice the invention described and claimed herein alone embodies the various aspects of the invention.

Elements described herein as coupled have an effectual relationship realizable by a direct connection or indirect connection with one or more other intervening elements.

Unless defined otherwise, all technical and scientific terms used herein have the same meaning as commonly understood by one of ordinary skill in the art to which this invention belongs. The verb "couple", its gerundial forms, and other variants, should be understood to refer to either direct connections or operative manners of interaction between elements of the invention through one or more intermediating elements, whether or not any such intermediating element is recited.

Any methods and materials similar or equivalent to those described herein are not considered abstract ideas and are considered to be significant improvements in the art when used in the practice of the invention. Representative illustrative methods and materials are also described. Additionally, it is intended that equivalents include both currently known equivalents and equivalents developed in the future, i.e., any elements developed that perform the same function, regardless of structure. The scope of the invention, therefore, is not intended to be limited to the exemplary aspects and embodiments shown and described herein.

In accordance with the various aspects of the invention, a computer and a computing device are articles of manufacture. Other examples of an article of manufacture include: an electronic component residing on a mother board, a server, a mainframe computer, or other special purpose computer each having one or more processors (e.g., a Central Processing Unit, a Graphical Processing Unit, or a microprocessor) that is configured to execute a computer readable program code (e.g., an algorithm, hardware, firmware, and/or software) to receive data, transmit data, store data, or perform methods.

The article of manufacture (e.g., computer or computing device, including displays and input devices) includes a non-transitory computer readable medium or storage/memory that may include a series of instructions, such as computer readable program steps or code encoded therein. In certain aspects of the invention, the non-transitory computer readable medium includes one or more data repositories. Thus, in certain embodiments that are in accordance with any aspect of the invention, computer readable program code (or code) is encoded in a non-transitory computer readable medium of the computer or computing device. The processor or a module, in turn, executes the computer readable program code to create or amend an existing computer-aided design using a tool. The term "module" as used herein may refer to one or more circuits, components, registers, processors, software subroutines, or any combination thereof. In other aspects and embodiments, the creation or amendment of the computer-aided design is implemented as a web-based software application, in which portions of the data related to the computer-aided design or the tool or the computer readable program code are received or transmitted to a computing device of a host.

An article of manufacture or system, in accordance with various aspects of the invention, is implemented in a variety of ways: with one or more distinct processors or microprocessors, volatile and/or non-volatile memory and peripherals or peripheral controllers; with an integrated microcontroller, which has a processor, local volatile and non-volatile memory, peripherals and input/output pins; discrete logic which implements a fixed version of the article of manufacture or system; and programmable logic which implements a version of the article of manufacture or system which can be reprogrammed either through a local or remote interface. Such logic could implement a control system either in logic or via a set of commands executed by a processor.

Accordingly, the preceding merely illustrates the various aspects and principles as incorporated in various embodiments of the invention. It will be appreciated that those of ordinary skill in the art will be able to devise various arrangements that, although not explicitly described or shown herein, embody the principles of the invention and are included within its spirit and scope. Furthermore, all examples and conditional language recited herein are principally intended to aid the reader in understanding the aspects and principles of the invention and the concepts contributed by the inventors to furthering the art, and are to be construed as being without limitation to such specifically recited examples and conditions.

Moreover, all statements herein reciting principles, aspects, and embodiments of the invention, as well as specific examples thereof, are intended to encompass both structural and functional equivalents thereof. Additionally, it is intended that such equivalents include both currently known equivalents and equivalents developed in the future, i.e., any elements developed that perform the same function, regardless of structure.

Therefore, the scope of the invention is not intended to be limited to the various aspects and embodiments discussed and described herein. Rather, the scope and spirit of invention are embodied in the appended claims.

What is claimed is:

1. A system for optimizing topology, the system comprising:

a processor;

a user input device in communication with the processor;

memory in communication with the processor; and a display in communication with the processor, wherein the memory includes code that is executed by the processor to cause the system to:

identify unoccupied white space in a physical floorplan defined by a plurality of Intellectual Property (IP) blocks located within the physical floorplan;

divide the white space into a plurality of non-overlapping contiguous windows;

define a subnetwork within each window of the plurality of windows, the subnetwork being specific to its respective window and the subnetwork representing a plurality of internal links, the plurality of internal links allow communication between a plurality of ports on the boundary of the respective window or on the boundary of any IP block inside the boundary of the respective window;

assign a plurality of virtual ports to the boundary of each window of the plurality of windows and connect the plurality of virtual ports to the subnetwork such that each virtual port of the plurality of virtual ports allows communication between the plurality of ports of each window and ports located outside of each window's boundary;

generate at least one communication path between two ports positioned in two different windows of the plurality of windows, the communication path representing at least one intended link;

optimize the at least one intended link by deleting any common boundary with any virtual port on the common boundary that is traversed by the at least one intended link; and analyzing the link, from end-to-end, to incrementally generate an optimized topology.

2. The system of claim 1, wherein the plurality of windows each have a boundary and collectively cover all of the I/O ports of the plurality of IP blocks within the physical floorplan.

3. The system of claim 1, wherein the plurality of virtual ports handle communication that crosses a window's boundary.

4. The system of claim 1, wherein the two different windows share a common boundary through a virtual port on the common boundary.

5. The system of claim 1, wherein the two different windows share two different boundaries of a common window.

6. The system of claim 1, wherein the optimized topology is a topology of an interconnect network of a system-on-chip.

7. The system of claim 1, wherein the optimized topology is a topology of a network-on-chip.

8. A method of using at least one non-transitory computer readable medium having code that, when executed by at least one processor, would cause the at least one processor to perform the method comprising the steps of:
identifying unoccupied space in a physical floorplan that is defined by a plurality of Intellectual Property (IP) blocks located in the physical floorplan;
dividing the space into a plurality of non-overlapping contiguous windows, wherein the plurality of windows collectively cover all ports of the plurality of IP blocks;
defining a subnetwork within each window of the plurality of windows, wherein:
the subnetwork is specific to its respective window,
the subnetwork represents a plurality of internal links,
the plurality of internal links route communication between a plurality of ports, and
the plurality of ports are located either on a boundary of a respective window or on the boundary of an IP block within the respective window;
assigning at least one virtual port to at least one boundary of each window of the plurality of windows, each virtual port routing communication between the subnetwork within each window and ports located outside of each window's boundary, such that the at least one virtual port handles communication that crosses that window's boundary;
connecting, with a network element, the at least one virtual port to the subnetwork;
generating, through the subnetwork and the at least one virtual port, at least one communication path between two ports of two different IP blocks, each IP block being positioned different windows selected from the plurality of windows, the different windows share a common boundary through the at least one virtual port, the communication path representing at least one intended link between the two different IP blocks;
optimizing the at least one intended link by deleting the common boundary and the at least one virtual port that is traversed by the link; and
analyzing the link, from end-to-end, to provide an incrementally optimized topology for a system-on-chip floorplan.

9. The method of claim 8, further comprising:
identifying, when a link from a first port on a first IP block within a first window selected from the plurality of non-overlapping contiguous windows to a second port on a second IP block within a second window selected from the plurality of non-overlapping contiguous windows may be completed by traversing at least two different sequences of windows selected from the plurality of non-overlapping contiguous windows, thus creating alternative possible communication paths; and
analyzing each alternative possible communication path and the corresponding sequences of traversed windows.

10. The method of claim 9 further comprising:
determining which of the alternative possible communication paths and the corresponding sequences of traversed windows is a most optimal communication path; and
analyzing other links while using the most optimal communication path and dropping all other possible alternative communication paths from evaluation of other links.

11. A method for synthesizing a physical implementation topology for a system with a plurality of Intellectual Property (IP) blocks, the method comprising:
identify white space in a physical floorplan defined by the plurality of IP blocks within the physical floorplan;
divide the white space into a plurality of windows, which are non-overlapping and contiguous;
define a subnetwork for a first window selected from the plurality of windows, the subnetwork including a plurality of internal links between a plurality of internal ports within the first window;
assign at least one virtual port to a boundary of the first window;
connect, with a communication link, the at least one virtual port to the subnetwork;
generate at least one communication path between two ports, at least one port being selected from the plurality of internal ports within the boundary of the first window and the other port being positioned within a second window, wherein the at least one communication path represents an intended communication link;
optimize the intended communication link by deleting the shared window boundaries and virtual ports traversed by the link; and
analyze the intended communication link from end to end to synthesize the topology and produce an incrementally optimized topology.

12. The method of claim 11, wherein the first window and the second window share a common boundary through the at least one virtual port.

13. The method of claim 11, wherein the first window and the second window each share a common boundary with a third window and the communication path traversed three windows and goes through the at least one virtual port.

14. The method of claim 11, wherein the plurality of windows, each, have a boundary and collectively cover all of the I/O ports of the plurality of IP blocks within the physical floorplan.

15. The method of claim 11, wherein the plurality of internal links are communication connections between the plurality of internal ports located on the boundary of each IP block included in the first window and ports located on the boundary of the first window.

16. The method of claim 11, wherein the at least one virtual port is a communication connection between a plurality of internal ports of the first window and ports located outside of the first window's boundary, such that the at least one virtual port handles communication crossing the first window's boundary.

* * * * *